«3,140,187
Patented July 7, 1964»

3,140,187
ORANGE CONCENTRATE AND METHOD OF MAKING
Jewell Allen Brent, Maitland, Fla., assignor to The Coca-Cola Company, Atlanta, Ga., a corporation of Delaware
No Drawing. Filed Sept. 18, 1961, Ser. No. 138,561
8 Claims. (Cl. 99—205)

This invention relates to an improved frozen fruit concentrate and in particular to frozen orange concentrate which is sold in refrigerated containers to be mixed with water to make a drink substantially identical with fresh orange juice.

It is common practice to concentrate orange juice under vacuum and freeze the concentrate for merchandising as indicated above. However, in the course of concentrating the juice, much of the essence which gives the characteristic flavor to fresh orange juice is removed during evaporation.

This essence consists generally of various volatile alcohols, esters, aldehydes and the like, most of which, because they are quite volatile, come off with the first part of the water removed in concentrating orange juice. Substantially all come off with the first 15% to 20% of such water.

To compensate for the loss of this essence, it has been common practice to add to concentrated juice a quantity of fresh juice, just prior to freezing the concentrate. This tends to give to the reconstituted product many of the flavor characteristics of the fresh juice.

The essence may be recovered from the juice in various ways. It can be taken off during juice concentration and the accompanying water vapors may be eliminated by appropriate condensation procedures, after which the essence may be condensed at low temperatures. Essence may also be recovered in reduced volume by appropriate stripping columns or the like from the vapors given off during juice concentration.

The essence thus recovered may be returned to the concentrated juice. However, if the essence is added back to the concentrate and the concentrate is stored under conditions familiar to the art, the flavor imparted by the esence is gradually lost. This may be due to hydrolysis aided by the natural acidity of the juice or may be the result of enzyme activity.

If the essence, however, is separated and stored separately at 40° F. or below, it is very stable toward flavor deterioration for months and even for more than a year.

In carrying out this invention the essence is added back to the orange concentrate in such a way that the concentrate and essence do not mix. This preserves against flavor deterioration.

Since the essence freezes at approximately 30°–32° F. and the orange concentrate of normal Brix, such as 42° to 50°, will not freeze until the temperature is reduced to approximately 20° F., in carrying out this invention, the essence is frozen and is then added to the orange concentrate when it is at a temperature below the freezing point of the essence. The essence is thus maintained in discrete frozen form and does not become intimately mixed with the orange concentrate as is the case when the essence is returned to the concentrate without maintaining its discrete nature by the freezing manipulation here employed.

In carrying out the invention fresh juice is stripped of the essence. This may be done in a Majonnier evaporator or in any suitable flash equipment. The fresh juice is heated to a temperature of approximately 195° F. It is then sprayed into an enclosed space where it is subjected to vacuum evaporation. The fresh juice which may be at about 12° Brix is stripped of approximately 15% to 20% of the liquid.

In the flash evaporator substantially all of the essence and approximately 15% to 20% of the water of the original juice are vaporized. The essence is recovered from these vapors by separating it from the majority of the water vapor. This may be done by selectively condensing the water vapors and the essence in suitable condensers.

It is usually accomplished by passing the condensate through appropriate strippers or scrubbers to reduce the volume to approximately one-twentieth ($\frac{1}{20}$) of the original volume of the condensate.

This is done because if the essence were not separated from the water vapors, the final product would not be at the desired concentration.

Although the above proces may be employed for recovering the essence, it will be understood that any other suitable means for recovering the essence and reducing it to frozen state may be employed.

In carrying out the process the juice which has been stripped in the Majonnier evaporator or in the flash equipment is taken to the regular evaporators where it is concentrated to any desired concentration. It is quite common to concentrate it to about 42° to 50° Brix, after which it is cooled to the desired temperature.

In general, the orange concentrate is taken down to a temperature of from 20° to 25° F. where it is still fluid and unfrozen. In this respect, the procedure is similar to that involved in normal concentration of orange juice.

In carrying out the process, the frozen essence, which is at a temperature of about 30° F., or just under the freezing point, is added to the orange concentrate which is at a temperature below the freezing point of the essence. The frozen essence which may be in snow form or in frozen pellet form, may be added to the colder orange concentrate. Since the concentrate is at a temperature below the freezing point of the essence, the essence will remain in discrete form.

Thereafter, the mixture of concentrate and frozen essence are placed in containers for sealing and freezing as is customary in handling frozen orange juice concentrate.

In carrying out all of these procedures it may be desirable to utilize an inert atmosphere such as nitrogen, and it is contemplated that the process be carried out if desider under such conditions. It is also contemplated that the filling of the containers and sealing be carried out in an inert atmosphere with or without sparging of the juice.

In carrying out the above procedures, it is contemplated that the amount of essence returned to the juice may be varied. It is possible to return all of the essence recovered from the juice or it may be that only part of the essence will be returned. It is also contemplated that additional essence be added if desired.

The product thus produced consists of concentrated orange juice having therein discrete pieces or a portion of frozen essence of the fresh juice, the product being at a temperature below the melting point of the frozen essence so that the frozen essence will remain discrete from the concentrate. The concentrate may be frozen or not.

This product has many advantages over other concentrated citrus or other fruit juices in that it does not tend to lose the flavor characteristics imparted by the essence on storage as would be the case if the concentrate and the essence were not maintained in discrete form. The product may be stored for long periods of time during merchandizing and since the deterioration of the flavor does not take place when the juice is reconstituted by adding water, the reconstituted juice will have a flavor substantially the same as fresh juice.

It will be understood that the above examples of the invention are given as illustrative only of the invention

I claim:

1. A method of producing frozen orange juice concentrate of natural flavor, comprising separating essence from fresh juice, concentrating and freezing said essence, concentrating fresh juice and reducing the temperature of the concentrated juice to a point below the melting point of said frozen essence, admixing said concentrate and frozen essence and maintaining the temperature of said mixture below the melting point of said frozen essence.

2. A method of producing frozen orange juice concentrate of natural flavor, comprising separating essence from fresh juice, freezing said essence, concentrating fresh juice and reducing the temperature of the concentrated juice to a point below the melting point of said frozen essence, admixing said concentrate and frozen essence and maintaining the temperature of said mixture below the melting point of said frozen essence.

3. A method of producing frozen fruit juice concentrate of natural flavor, comprising separating essence from fresh juice, concentrating and freezing said essence, concentrating fresh juice and reducing the temperature of the concentrated juice to a point below the melting point of said frozen essence, admixing said concentrate and frozen essence and maintaining the temperature of said mixture below the melting point of said frozen essence.

4. A method of producing frozen fruit juice concentrate of natural flavor, comprising separating essence from fresh juice, freezing said essence, concentrating fresh juice and reducing the temperature of the concentrated juice to a point below the melting point of said frozen essence, admixing said concentrate and frozen essence and maintaining the temperature of said mixture below the melting point of said frozen essence.

5. A method of producing frozen orange juice concentrate of natural flavor, comprising concentrating fresh juice and reducing the temperature of the concentrate to a point below the melting point of frozen essence of orange juice, admixing said concentrate and frozen essence of orange juice and maintaining the temperature of said mixture below the melting point of said frozen essence.

6. A method of producing frozen orange juice concentrate of natural flavor, comprising separating the essence from fresh juice, concentrating fresh juice and reducing the temperature of the concentrate to a point below the freezing point of said essence, adding said essence to said concentrate and maintaining the temperature of the mixture below the freezing point of said essence.

7. Concentrate for the preparation of reconstituted orange juice, as prepared by the method of claim 1, comprising orange juice concentrate at a Brix higher than unconcentrated orange juice having therein discrete pieces of frozen essence from fresh juice, said concentrate and frozen essence being at a temperature below the melting point of the frozen essence.

8. Concentrate for the preparation of reconstituted fruit juice, as prepared by the method of claim 4, comprising fruit juice concentrate at a Brix higher than unconcentrated juice having therein discrete pieces of frozen essence from fresh juice, said concentrate and frozen essence being at a temperature below the melting point of the frozen essence.

References Cited in the file of this patent
UNITED STATES PATENTS

| | | |
|---|---|---|
| 2,453,109 | MacDowell | Nov. 9, 1948 |
| 2,911,308 | Smith | Nov. 3, 1959 |